J. W. GWINN & J. DAWSON.
FLEXIBLE TUBE.
APPLICATION FILED MAR. 1, 1911.

1,068,386.

Patented July 22, 1913.

Witnesses
J.H.Crawford

Inventor
John W. Gwinn,
John Dawson,
By Victor J. Evans
Attorney

UNITED STATES PATENT OFFICE.

JOHN W. GWINN AND JOHN DAWSON, OF TURNER, WASHINGTON.

FLEXIBLE TUBE.

1,068,386.  Specification of Letters Patent.  Patented July 22, 1913.

Application filed March 1, 1911. Serial No. 611,613.

*To all whom it may concern:*

Be it known that we, JOHN W. GWINN and JOHN DAWSON, citizens of the United States, residing at Turner, in the county of Columbia and State of Washington, have invented new and useful Improvements in Flexible Tubes, of which the following is a specification.

The present invention relates to improvements in pipe connections.

In carrying out the invention it is our purpose to provide a connection of this character which will impart flexibility to the pipes composed of a plurality of sections irrespective of the inflexible nature of the material of which the sections of the pipe are composed.

A further object of the invention is to provide a simple connection for this purpose which may be easily removed when it is desired to disconnect any of the sections of the pipe.

With the above and other objects in view which will be more apparent as the nature of the invention is disclosed, the improvement consists in the novel construction and arrangement of parts hereinafter fully described and claimed.

Figure 1:
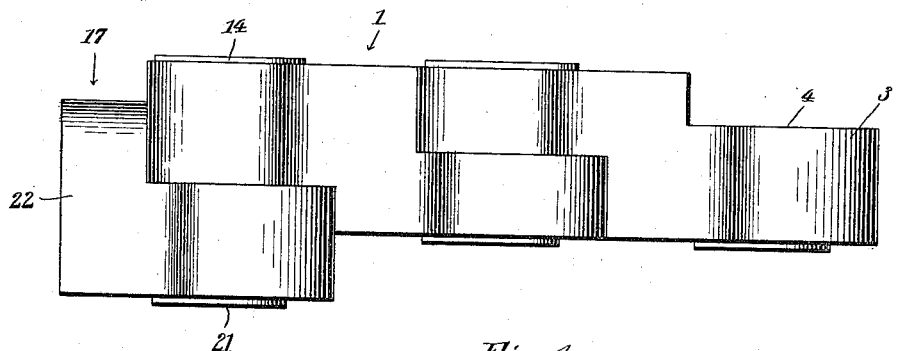
Figure 2:
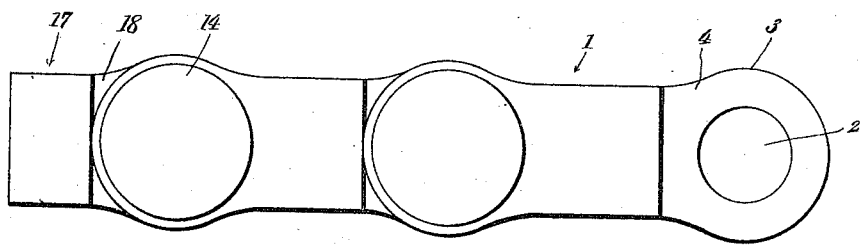
Figure 3:
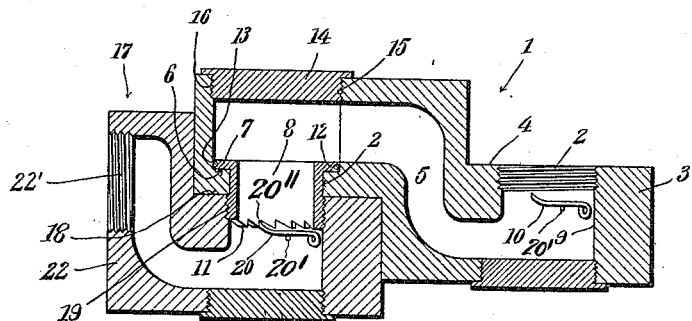
Figure 4:
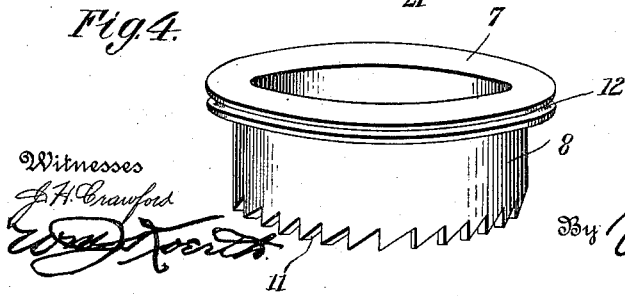

In the accompanying drawings, Figure 1 is a side elevation of a portion of the tube constructed in accordance with the present invention. Fig. 2 is a top plan view of the same. Fig. 3 is a longitudinal sectional view of the same. Fig. 4 is a perspective view of one of the collars employed for connecting two of the sections.

In the drawings the numeral 1 designates one of the links forming a section of the pipe or tube. Each of the links 1, in plan, is a substantially 8-shaped form and the rounded ends of each of the said links are provided with openings 2. The links 1 are provided adjacent their opposite ends with enlargements 3 and the faces of the links directly below the oppositely arranged enlargements are horizontally flat. The openings 2 pass through the said flattened faces which are designated by the numerals 4 and the portion of each of the links between the enlargements are formed with channels 5 which communicate with the oppositely arranged openings 2. The links are provided each with a seat 6 which is arranged upon the upper wall provided with the opening 2, the said seat being adapted for the reception of the offset flange 7 provided upon a bushing 8. The bushing has its lower extremity threaded and the same is adapted to engage threads provided upon the wall of the opening 2 of the coacting link 1. This wall, designated by the numeral 9, is also provided with a spring stop 10, and the rear extremity of the bushing 8 is formed with teeth 11 which are adapted to contact with the spring. By this arrangement it will be noted that the coacting links 1 may be free to rotate with the bushing 8 without allowing the said bushing to become disconnected from either of the links. The offset flange 7 of the bushing 8 is provided with an annular depression 12 and the said depression is adapted for the reception of the split resilient spring member 13. This spring member serves as a gasket and is adapted to engage the annular wall of the seat 6, and by this arrangement it will be noted that the connecting links are rendered perfectly air-tight while at the same time they are free to revolve one upon the other.

The numerals 14 designate the caps for closing the openings 2. The said caps are each formed with a reduced threaded portion 15, and the said threads are adapted to engage with similar threads 16 formed upon the walls provided by the openings 2 adjacent the portions of the links engaged by the bushings 8. It will be noted that in order to separate any of the links it is merely necessary to remove the cap 14 when the spring 10 engaging the teeth of the bushing may be forced out of engagement therewith and the collar readily removed.

The numerals 17 designate the end sections of the device. These ends are of a formation approximately agreeing with one-half of each of the links 1, the said ends having each a flattened face 18 formed with a bore or opening 19, the same being threaded and adapted for the reception of one of the bushings 8. The bore or opening 19 is further provided with a spring 20, the latter adapted to engage with the teeth of the said bushing 8. The spring 20 comprises a flat pivoted member, and is provided with a stop for limiting the downward movement thereof when the tooth of the spring is in engaging position, as will presently be set forth. The end 17 has its lower face closed through the medium of a cap 21 which is similar to the caps employed in connection with the links 1 and the said end has its enlarged portion 22 provided with a suitable opening which communicates with the opening 19 thereof. This ball opening 22 is preferably threaded and is adapted for the reception of a nozzle or the like whereby the fluid passing through the tube may be sprayed.

The stops for the spring members are indicated by the numerals 20' (see Fig. 3). The stops are positioned approximately centrally of the springs and are of course, adapted to limit the downward movement of the said springs. The springs, it will be noted, by reference to Fig. 3 have their ends upset or curved to provide engaging lips $20^2$ and the stops are adapted to force the said lips into engagement with the teeth of the bushing when the bushing is positioned within the tube and the said stops are so arranged with relation to the springs that it will require the bending of the lips of the said springs before the springs can be disengaged from the teeth of the bushing.

From the above description taken in connection with the accompanying drawings, the simplicity of the device as well as the advantages thereof will, it is thought, be apparent to those skilled in the art to which the invention appertains and it is to be understood that while we have illustrated and described the preferred embodiment of the improvement, changes in the minor details of construction may be made if desired.

Having thus fully described the invention, what we claim as new, is:—

In a flexible tube, 8-shaped links each having its opposite faces adjacent its ends depressed to provide bearing faces for a co-acting link, each end of the link being provided with a plurality of openings, removable closures for the openings in the faces opposite the bearing faces of the link, a flanged bushing arranged within one of the other openings and extending beyond the adjacent bearing face, said bushing having a threaded end adapted to engage the threads in a co-acting link, said bushing having one edge provided with teeth the opening in the other bearing face of the link being threaded and being provided with a spring stop, substantially as and for the purpose set forth.

In testimony whereof we affix our signatures in presence of two witnesses.
JOHN W. GWINN.
JOHN DAWSON.

Witnesses:
E. G. GOWING,
LEON B. KENWORTHY.